Figure 6:
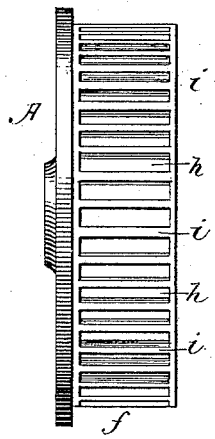

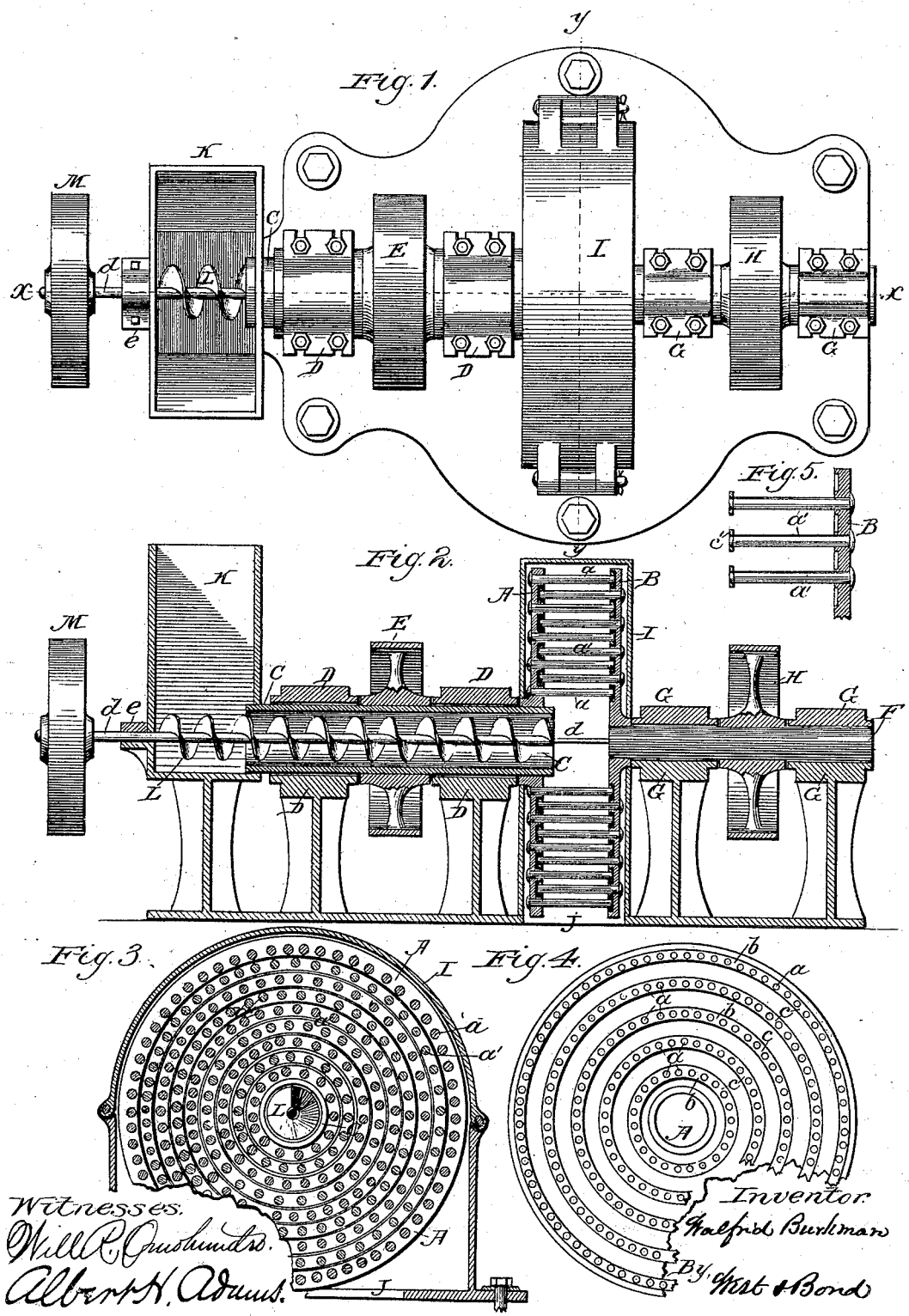

(No Model.)

W. BURKMAN.
CLAY REDUCER AND DISINTEGRATOR.

No. 312,808. Patented Feb. 24, 1885.

Witnesses.
Will R. Onohundro
Albert H. Adams.

Inventor,
Walfrid Burkman
By West & Bond
Attys

UNITED STATES PATENT OFFICE.

WALFRID BURKMAN, OF CHICAGO, ILLINOIS, ASSIGNOR TO CHARLES H. FROST, OF SAME PLACE.

CLAY REDUCER AND DISINTEGRATOR.

SPECIFICATION forming part of Letters Patent No. 312,803, dated February 24, 1885.

Application filed May 5, 1884. (No model.)

*To all whom it may concern:*

Be it known that I, WALFRID BURKMAN, residing at Chicago, in the county of Cook and State of Illinois, and a subject of the King of Sweden, have invented new and useful Improvements in Clay Reducers and Disintegrators, of which the following is a full description, reference being had to the accompanying drawings, in which—

Figure 1 is a plan; Fig. 2, a vertical longitudinal section at line $x$ of Fig. 1; Fig. 3, a cross-section at line $y$ of Fig. 1; Fig. 4, a plan of one disk provided with pins; Fig. 5 an enlarged detail. Figs. 6, 7, 8, and 9 show modifications. Fig. 10 is a plan of either one of the modified forms shown in Figs. 6, 7, 8, and 9.

The object of my invention is to provide improved means for pulverizing and disintegrating clay and other material, and to provide suitable means for feeding the material to the pulverizer, which I accomplish by the mechanism illustrated in the accompanying drawings, in which—

A represents a disk, which, as shown in Figs. 2, 3, and 4, is provided with five rows of pins, $a$, firmly secured at one end in the disk. The other ends of the pins in each row are supported by an annular ring, $b$, leaving spaces $c$ between the rows of pins and rings, as indicated in Fig. 4.

B is another disk, provided, as shown, with four rows of concentric pins, $a'$, one end of these pins being secured in the disk, and the other ends of each row being supported by an annular ring, $c'$, as before described. When the disks are in position for use, the pins of the two disks will all be in concentric rows, as shown in Figs. 2 and 3. The disk A is permanently secured upon the hollow shaft C, which is supported in bearings D.

E is a driving-pulley on the shaft C.

The disk B is firmly secured to a shaft, F, supported in bearings G, and provided with a driving-pulley, H.

I is a case inclosing the disks A B, and provided with a discharge-opening, J.

K is the hopper.

L is a screw-feed, the shaft $d$ of which is supported at one end in a bearing, $e$, and the other end is supported in the end of the shaft F, so as to revolve independent of the latter, and consequently at a different rate of speed.

M is a pulley to drive the screw-feed.

The operation is as follows: The clay to be pulverized is fed into the hopper K, and will be gradually carried by the screw-feed through the hollow shaft C, and delivered into the open space at the center of the two disks, which should be rotated with considerable rapidity in opposite directions, and the clay by centrifugal force will be gradually thrown to the periphery of the disks, and on its way will be thoroughly and finely pulverized by the action of the pins $a\ a'$, between which it must pass. The clay will be discharged through the outlet J, and the particles will be left in a partly spherical or irregular form and not flat, which is desirable if the clay is to be compacted.

As shown, the disks are supposed to be thirty inches in diameter, and disks of this size should make five or six hundred revolutions a minute, the speed depending somewhat on the nature of the material, hard material requiring the greater speed. The fineness with which the clay will be pulverized can be regulated by varying the speed of the disks.

As shown, the pins $a\ a'$ are round; but I do not limit myself to this form, as they may be many-sided; but I find that round pins do the work effectually.

I do not limit myself to any specific number of pins in each row, and have shown a greater number in Fig. 4 than in Fig. 3. Ordinarily it will be advisable to place the pins in the inner row somewhat farther apart than indicated in the drawings, gradually decreasing the distance of the pins from each other in each row from the inner to the outer row.

The disks might be placed in a horizontal position; but the work will be done more effectually if placed vertically, as shown in Fig. 2.

As shown, the upper part of the case I is detachably secured in place, so that it can easily be removed. Each disk, as shown, is provided with a small hub, to receive the shaft which carries it. The size of the hub which receives the hollow shaft may be varied as circumstances require, and in Fig. 4 I have shown the central opening somewhat larger than in Fig. 3.

The machine described is adapted to be used in pulverizing many articles other than clay.

A greater or less number of rows of pins than shown in the drawings may be used. One inch in diameter and six inches in length is a suitable size for the pins. I recommend that the pins near the center of the disks be made of steel, but those in the outer rows may be made of iron. The number of pins in each row must depend somewhat upon the material to be pulverized. Material which is quite damp can be successfully pulverized in this machine. Material which passes through this machine will be so thoroughly and uniformly pulverized that ordinarily no separation of coarser from finer parts will be required.

Instead of making the pins separate from the disk and riveting them thereto, they may be cast on and with the disks, or a part of them may be cast, and those near the center may be made of steel and riveted in place.

Instead of providing disks with pins riveted thereto or cast thereon, a series of concentric rings may be cast on the disks, with spaces between the adjoining rings, the rings being provided with openings of various forms, through which the material can pass substantially in the same manner as it passes between the pins when they are used. This construction is shown in Figs. 6, 7, 8, 9, and 10.

Fig. 10 is a plan or face view of a disk, A, provided with a series of concentric rings, $f$, cast upon and with the disk, with spaces $g$ between the adjoining rings.

In Fig. 6 the outside ring $f$ is shown, and it is provided with a series of long slots, $h$, leaving metal bars $i$ between the slots, which bars $i$ take the place of the pins before described.

Figure 7:
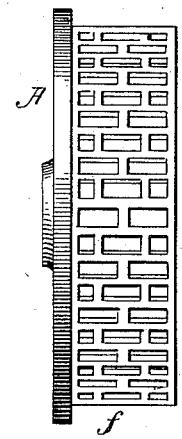
Figure 8:
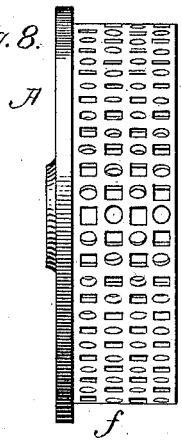
Figure 9:
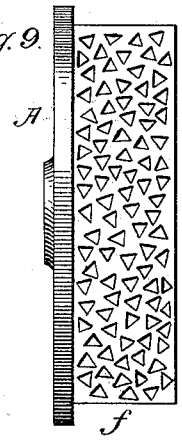
Figure 10:
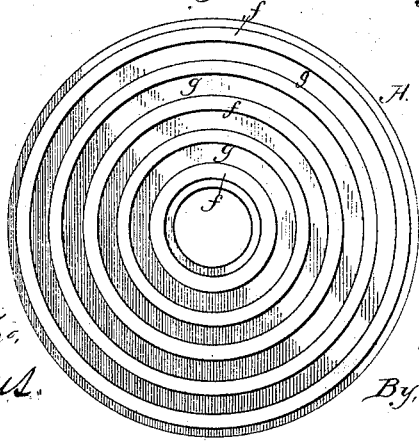

In each of the Figs. 7, 8, and 9 I have shown a disk and ring similar to that shown in Fig. 6, except that openings of different forms are shown in such rings. The other disk, designed to be used with the one shown in Fig. 10, may be provided with a series of concentric rings with openings in the same, the rings being arranged to pass into the spaces $g$ when the two disks are brought together for use. The openings in the rings near the center of the disks may be larger than those in the outside rings.

What I claim as new, and desire to secure by Letters Patent, is as follows:

1. In a reducer and disintegrator, the combination of the two disks provided each with solid or perforated rings or rows of pins concentrically arranged and supported at the end next to the opposite disks by rings secured to the perforated rings or rows of pins, a shaft carrying one of said disks, a separate hollow shaft carrying the other disk and adapted to feed material to the center of the disks, and a screw-feed within said hollow shaft, revolving independently of said shafts, substantially as described.

2. In a reducer and disintegrator, the combination of two disks provided each with a series of concentric rows of teeth or rings, the teeth or rings of one disk operating independently of those of the other disk, a solid shaft carrying one of said disks, a hollow shaft carrying the other disk, and a screw-feed within said hollow shaft, having one end bearing in the solid shaft, but rotating independently thereof, for feeding material to the center of said disks, substantially as described.

WALFRID BURKMAN.

Witnesses:
ALBERT H. ADAMS,
O. W. BOND.